United States Patent
Rubbmark et al.

(10) Patent No.: US 6,549,790 B1
(45) Date of Patent: Apr. 15, 2003

(54) PORTABLE TELECOMMUNICATION APPARATUS FOR MULTIPLE AUDIO ACCESSORIES

(75) Inventors: Jan Ragnar Rubbmark, Malmö (SE); Magnus Svensson, Malmö (SE); Lars Engelin, Södra Sandby (SE)

(73) Assignee: Telefonaktiebolaget LM Ericsson (publ), Stockholm (CH)

( * ) Notice: Subject to any disclaimer, the term of this patent is extended or adjusted under 35 U.S.C. 154(b) by 0 days.

(21) Appl. No.: 09/492,107

(22) Filed: Jan. 27, 2000

(30) Foreign Application Priority Data

Jan. 27, 1999 (SE) .............................. 9900290

(51) Int. Cl.⁷ .............................. H04Q 7/20; H04B 1/38
(52) U.S. Cl. ....................................... 455/557; 455/569
(58) Field of Search ................................ 379/56.2, 56.3, 379/165, 55.1, 56.1, 420.04, 420.01, 420.02, 420.3, 428.01, 428.02; 455/550, 557, 556, 568, 569, 575

(56) References Cited

U.S. PATENT DOCUMENTS

| | | | | |
|---|---|---|---|---|
| 4,776,000 A | * | 10/1988 | Parienti | 455/407 |
| 4,991,197 A | * | 2/1991 | Morris | 455/557 |
| 5,109,402 A | * | 4/1992 | Anderson et al. | 455/557 |
| 5,408,520 A | * | 4/1995 | Clark et al. | 379/93.07 |
| 5,475,872 A | | 12/1995 | Sato | 455/550 |
| 5,794,163 A | | 8/1998 | Paterson et al. | 455/568 |
| 5,797,102 A | * | 8/1998 | Hallikainen et al. | 455/557 |
| 5,884,191 A | * | 3/1999 | Karpus et al. | 455/557 |
| 6,230,029 B1 | * | 5/2001 | Hahn et al. | 455/568 |
| 6,272,359 B1 | * | 8/2001 | Kivela et al. | 455/567 |

FOREIGN PATENT DOCUMENTS

| | | |
|---|---|---|
| DE | 19820453 | 1/1999 |
| SE | 9800697-6 | 9/1999 |

* cited by examiner

*Primary Examiner*—Tracy Legree
(74) *Attorney, Agent, or Firm*—Nixon & Vanderhye, PC

(57) ABSTRACT

The portable telecommunications apparatus has an audio input for receiving sound, an audio output for generating sound, a controller for controlling the audio input and the audio output, and an audio accessory interface for operatively connecting an external audio accessory. The accessory is capable of receiving external sound and forwarding it as audio signals to the apparatus and/or capable of generating external sound in response to audio signals supplied from the apparatus. The controller is arranged to receive a request for an audio service from any of at least two audio accessories operatively connected to the apparatus. The controller also has a logical state machine, the individual states of which represent possible operational conditions for the telecommunication apparatus and the audio accessories. The state machine defines how the request for audio service is to be handled each of the operational conditions. The controller provides the audio service to an individual audio accessory among the audio accessories, as defined by the state machine.

29 Claims, 4 Drawing Sheets

PORTABLE TELECOMMUNICATION APPARATUS FOR MULTIPLE AUDIO ACCESSORIES

TECHNICAL FIELD

The present invention relates to a portable telecommunication apparatus, comprising an audio input, such as a microphone, an audio output, such as a speaker, a controller for controlling the audio input and the audio output. An audio accessory interface operatively connects an external audio accessory capable of receiving the external sound and forwarding it to the apparatus and/or capable of generating external sound forwarded from the apparatus.

BACKGROUND

Mobile telephones are perhaps the most prominent example of a portable telecommunication apparatus as set out above. Consequently, for the rest of this document a mobile telephone is referred to, in a non-limiting sense, for exemplifying the portable telecommunication apparatus according to the present invention.

Following the rapidly increasing popularity of mobile telephones, the flora of audio accessories for mobile telephones has grown correspondingly. Examples of commercially available accessories are vehicle-installed stationary handsfree units, portable handsfree units (headsets), cordless headsets, portable computers with audio capabilities, etc. As long as a single audio accessory is to be used together with the telephone, the interaction and control thereof is fairly easy to design and implement. For instance, if a stationary handsfree unit is to be used together with the mobile telephone, the mobile telephone it self will normally direct incoming and outgoing audio through its internal microphone and speaker. Once the mobile telephone has been installed in the stationary handsfree unit, the audio control is fully transferred to the handsfree unit, i.e. all audio is immediately directed through the external speaker and the microphone of the handsfree unit, and simultaneously the internal speaker and microphone of the mobile telephone are turned off.

However, it is much more difficult to control the interaction and operation of more than one audio accessory connected at the same time to a single mobile telephone.

Many difficult questions arise when trying to handle audio control for more than one audio accessory connected at the same time. For instance, to whom shall the audio be directed upon reception of a telephone call? How will the accessories know which of the accessories that will control the call? How shall a call be transferred from one audio accessory to another? To which audio accessory shall the telephone generate a ring signal for notifying an incoming telephone call? These and other questions must be solved in order to avoid technical malfunction and user disturbance.

SUMMARY OF THE INVENTION

It is an object of the present invention to provide improved audio control for mobile telephones, allowing multiple audio accessories to be concurrently connected to the mobile telephone.

The object may be achieved by establishing a set of rules for the communication between the mobile telephone and all audio accessories operatively connected thereto, combined with arranging the controller of the mobile telephone to operate in accordance a of with a logical state machine, which provides a clear definition of how audio control is to be dealt with for every possible condition, irrespective of the number, type and operational state of audio accessories connected to the mobile telephone. By these provisions, each audio accessory is forced to send relevant user actions to the mobile telephone and request an appropriate service from the mobile telephone, which has unrestricted and continuous control of the audio services.

Other objects, features and advantages of the present invention appear from the following detailed disclosure, from the appended claims as well as from the accompanying drawings.

BRIEF DESCRIPTION OF THE DRAWINGS

A preferred embodiment of the present invention will now be described in more detail, reference being made to the accompanying drawings, in which.

DETAILED DESCRIPTION OF THE PREFERRED EMBODIMENT

Figure 1:
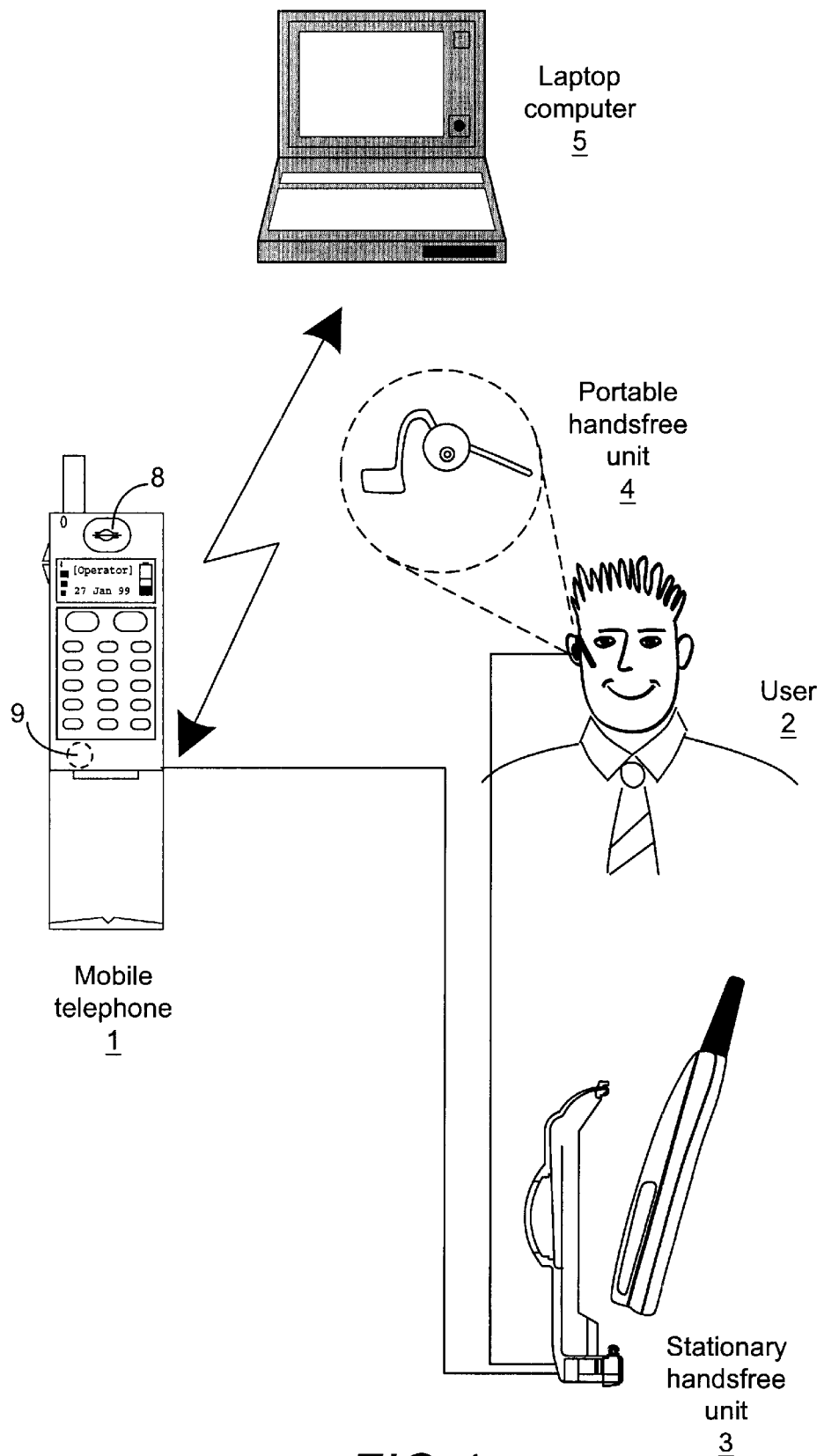
FIG. 1 provides an illustrated example of a possible scenario, where a user of a mobile telephone has connected multiple audio accessories to the telephone.

FIG. 1 illustrates an exemplifying user scenario, where a user 2 of a mobile telephone 1 makes use of multiple audio accessories. Firstly, a stationary handsfree unit 3 is connected via a cord to the mobile telephone 1. The stationary handsfree unit 3 may be mounted in a vehicle belonging to the user 2. Furthermore, the user 2 has connected a portable handsfree unit 4 via a cord to the stationary hands free unit 3. The portable hands free unit 4 is a headset device, which for instance may improve the vocal sound quality in a noisy environment, such as inside a vehicle driving at high speed. The improved vocal sound quality is obtained, since both the microphone and the speaker of the portable handsfree unit 4 are located much closer to the ear and mouth of the user 2 than the speaker and microphone of the stationary handsfree unit 3.

Furthermore, the user 2 has connected a laptop computer 5 to the mobile telephone 1 via a wireless link, such as IR or radio link. The laptop computer 5 has a PC speaker as well as a microphone attached thereto, and by installing software for computer-based vocal telecommunication, the laptop computer 5 may be used for voice calls. Furthermore, the laptop computer 5 may be used together with the mobile telephone 1 for performing data calls, such as Internet browsing sessions, email communication, etc.

Figure 2:
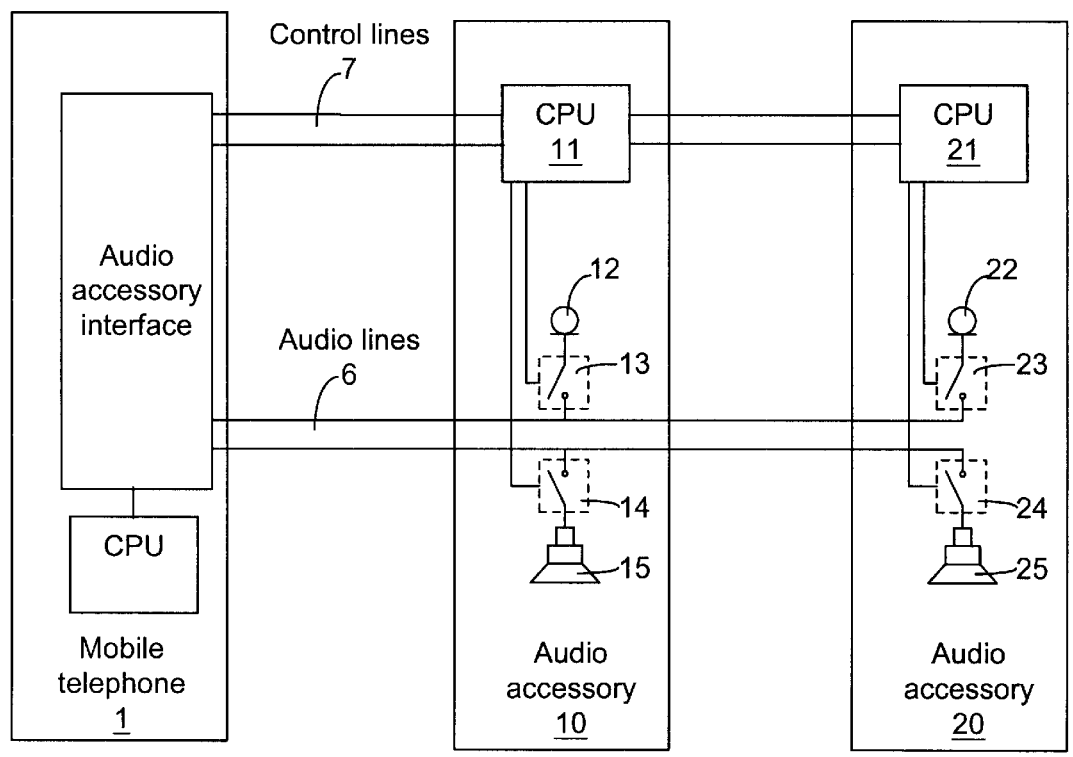
FIG. 2 is a schematic block diagram of the mobile telephone and two audio accessories connected thereto.

Referring to FIG. 1 and FIG. 2, the mobile telephone 1 is schematically illustrated together with a first audio accessory 10 and a second audio accessory 20. The audio accessories 10 and 20 may for instance be of any of the types shown in FIG. 1. The mobile telephone 1, which has audio output means in the form of a speaker 8 as well as audio input means in the form of a microphone 9, is of a kind generally known per se and is not described in more detail herein. The mobile telephone 1 has an audio accessory interface, which allows audio accessories to be connected to the mobile telephone through audio lines 6 and control lines 7. The mobile telephone also has a controller, such as a CPU (Central Processing Unit) for controlling the operation of connected audio accessories 10 and 20, as will be described in more detail below.

As shown in FIG. 2, each audio accessory 10 and 20 comprises a CPU 11/21, a microphone 12/22 and a speaker 15/25. The microphone 12/22 and the speaker 15/25 are connected to the audio lines 6 through switches 13/23 and 14/24, respectively. The switches 13/23 and 14/24 are controlled by the respective CPU 11/21, which in turn is controlled, through the control lines 7, by the controller of the mobile telephone 1. Hence, the mobile telephone 1, or more specifically the controller thereof, has full control of which of the microphones 12, 22 and speakers 15, 25 that are active and connected to the audio lines 6. Therefore, the mobile telephone 1 may exercise audio control of its own microphone 9 and speaker 8 as well as the microphones 12, 22 and speakers 15, 25 of the multiple audio accessories 10, 20, so that incoming or outgoing audio services (for instance ring signal, voice activated dialing, vocal call termination or normal speech) may be selectively and independently directed to any of the microphones 9, 12, 22 or speakers 8, 15, 25.

According to a preferred embodiment, the mobile telephone 1 and the audio accessories 10, 20 communicate by exchanging AT commands, i.e. commands based upon the command set originally developed by Hayes Microcomputer Products Inc. to control modems from a computer terminal.

In FIG. 2, both audio accessories 10, 20 are connected to the mobile telephone 1 by electrical cord. However, the audio accessories may equally well be connected to the mobile telephone 1 by e.g. optical fiber cord. Alternatively, the accessories may be connected cordlessly to the mobile telephone 1 (cf. laptop computer 5 in FIG. 1), e.g. by radio link or IR (infrared) link.

Figure 3:
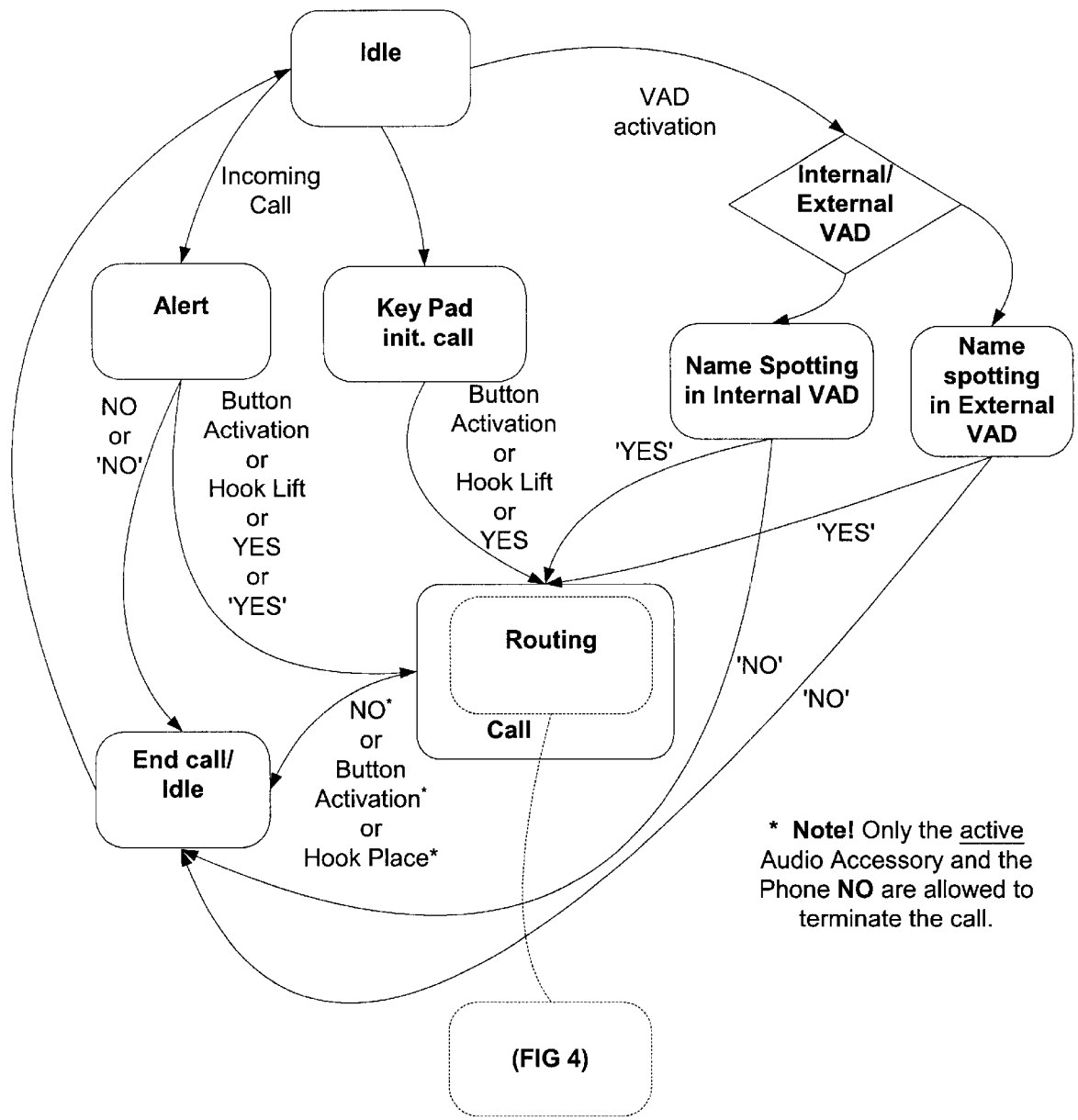
FIG. 3 is a first logic state machine graph illustrating the way, in which the mobile telephone and the audio accessories are arranged to operate.

FIG. 3 illustrates a logical state machine graph, which is implemented by the controller of the mobile telephone 1 and is used for exercising aforesaid audio control.

Figure 4:
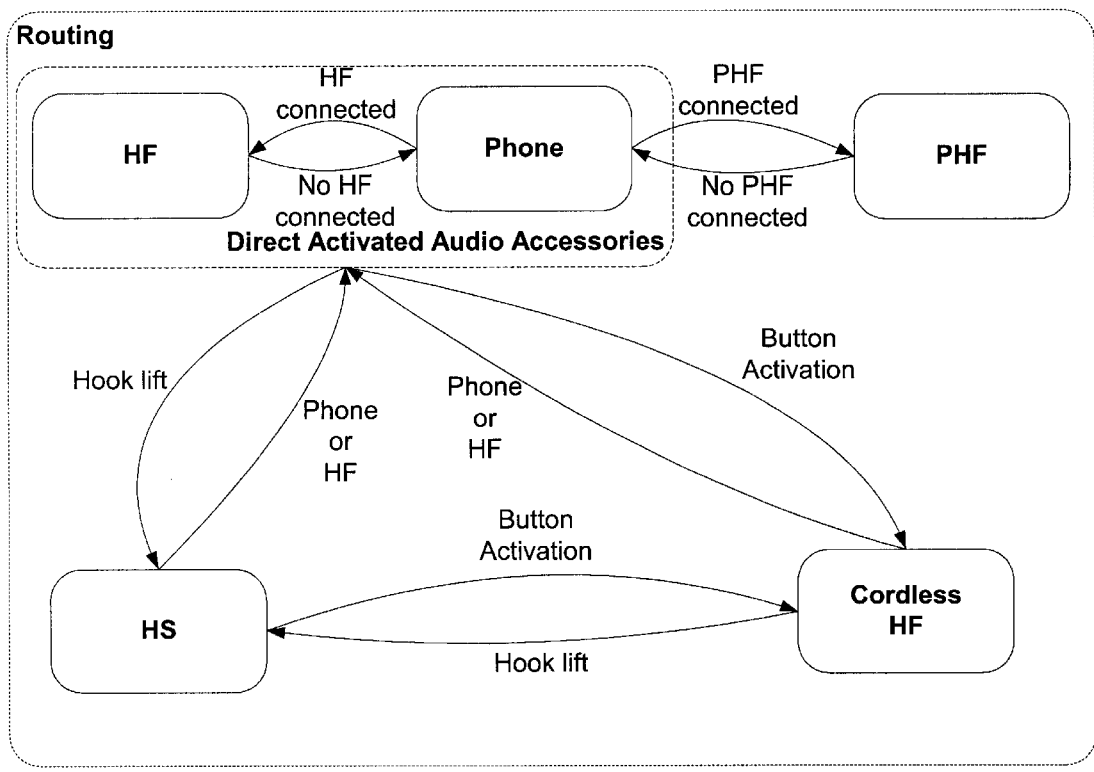
FIG. 4 is a second logic state machine graph illustrating the way, in which the mobile telephone and the audio accessories are arranged to operate.

FIG. 4 illustrates a second graph for a specific part (routing) of the state machine shown in FIG. 3. These state machine graphs, and the audio control exercised by the controller of the mobile telephone 1, will be thoroughly described below.

1. DEFINITIONS

| 1. DEFINITIONS | |
|---|---|
| Term | Description |
| MS | Mobile Station, i.e. the mobile telephone 1 shown in FIGS. 1 and 2 |
| AFMS | Audio From Mobile Station |
| ATMS | Audio To Mobile Station |
| ACB | Accessory Control Bus |
| CFMS | Accessory Control From Mobile Station |
| CTMS | Accessory Control To Mobile Station |
| DFMS | Data From Mobile Station |
| DTMS | Data To Mobile Station |
| CHF | Cordless Hands Free |
| PHF | Portable Hands Free |
| VAA | Voice Activated Answer |
| VAD | Voice Activated Dialing |
| RTS | Ready To Send |
| CTS | Clear To Send |

2. TERMINOLOGY OF ACCESSORIES

The system interface (default) will contain 2 separate serial communication busses, Data To/From Mobile Station DTMS/DFMS and Accessory Control To/From Mobile Station CTMS/CFMS (cf. audio lines 6 and control line 7 of FIG. 2). The terminology below is valid for communication busses.

Cascade accessories: Accessories that pass the respective serial communication interface signals provided by the primary interface, through to the secondary side with possibility to use this serial communication link for its own use, even though there is another device hooked up to its secondary interface. The Cascade Accessory needs to support a multiplexing transport communication protocol. The audio accessory 10 in FIG. 2 is a cascade accessory.

3. AT COMMANDS FOR AUDIO FUNCTIONALITY

These AT commands are used to set the audio functionality in the MS. These commands are usually sent at the initialization phase but could be sent to the MS at any time.

AT*EAMS—ERICSSON AUDIO MODE SELECTION

This command is used for Audio mode selection, and sets a number of audio parameters.

AT*EALR—ERICSSON AUDIO LINE REQUEST

Audio accessories that request the use of the analog audio ATMS and AFMS lines use this command.

The MS uses an unsolicited *EALR command to set which accessory that is allowed to use the AFMS and the ATMS. Generally speaking, an unsolicited command is a command, which is sent by the MS without any prior request from an accessory.

AT*EARS—ERICSSON ANALOG RING SIGNAL (AFMS) REQUEST

This command is used for requesting an analog ring signal in the loudspeaker (i.e. on AFMS).

AT*EMIR—ERICSSON MUTE INDICATION REQUEST

Accessories that request mute indications, even if another accessory takes the call, use this command.

AT*ELAM—ERICSSON LOCAL AUDIO MODE

This command is used to route the microphone and/or the loudspeaker signal to the system Bus.

AT*EVAD—ERICSSON VAD FUNCTION MODE SELECTION

This command is used for indication of External VAD functionality, see below, and the enabling/disabling of the External VAD functionality.

AT*EPHD—ERICSSON PORTABLE HANDS FREE DETECTION

Cascade Accessories use this command to indicate to the MS that the voltage level of CFMS on the downstream side is constantly low.

AT*ECBP ERICSSON CHF BUTTON PUSHED

This command is used for the Cordless Hands Free to indicate for the MS that the CHF button has been pushed.

AT*EVDA ERICSSON VOICE DIALLING ACTIVATION

This command is used to enter the "name spotting procedure" state described further below. Receiving the AT*EVDA command is described as the "VAD activation" event in the audio control state machine shown in FIG. 3. The command is only valid in the Idle state. In all other states, this command is neglected.

AT*EVA ANSWERING INCOMING CALL COMMAND

Signals the Mobile Station, MS, to answer an incoming call.

AT*EVD VOICE DIAL COMMAND

Instructs the Mobile Station, MS, to originate a voice call.

AT*EVH VOICE HOOK COMMAND

Signals the Mobile Station, MS, to terminate an active voice call.

AT*ECAM ERICSSON CALL MONITORING

This command is used for enabling/disabling the call monitoring functionality in the MS, which informs the accessory of call events, such as incoming call, connected, hang up etc.

*ECAV UNSOLICITED CALL MONITORING RESULT CODES

Unsolicited result codes sent from the Mobile Station, MS.

4. REQUIREMENTS AND RULES

Audio line functionality

All audio accessories shall be connected in parallel in a multi-drop configuration (see FIG. 2), i.e. the Audio To/From Mobile Station, ATMS/AFMS signals. The accessories themselves should turn on and off the audio, i.e. the speakers and/or microphones.

The only exception is the Portable HandsFree unit, PHF; since the audio bus is a multi-drop bus, the Portable Handsfree will automatically be connected, and because there is no controlling mechanism in the Portable Handsfree, it is not possible to turn it off. Therefore, when the Portable Handsfree is connected to the phone either directly or at the end of a cascading accessory, it always gets the audio.

Logical Channels

All audio AT commands regarding a specific audio accessory shall be sent on the same logical channel. This requirement is due to the fact that the MS separates the audio accessories by the logical channels.

The addressing protocol uses dynamic addressing, i.e. the logical addresses assigned to the audio accessories de pend on the order in which they were connected to the MS.

Initialization and Authentication

The accessory starts the initialization phase by sending a predefined authentication sequence.

Audio Mode Selection

When an accessory is being connected to the Mobile Station, MS, it shall send the AT*EAMS (see above) command in order to set the Audio mode settings for the accessory in the MS. One exception may be Portable Hands Free, which holds the CFMS line constantly low to indicate to the MS, that the accessory is connected.

The AT command may also be sent anytime after the initialization phase to change the Audio mode setting.

Request to Use the Audio Lines

If the Accessory wants to be connected to AFMS/ATMS, it has to send the AT*EALR (see above) command and request AFMS/ATMS. One exception may be Portable Hands Free, which is always connected to ATMS/ATMS.

Request Ring Signal in Loudspeaker

If the Accessory wants a ring signal on AFMS to indicate an incoming call, it has to request this by the AT*EARS command (see above).

Request Mute Indications

If the Accessory wants to mute another electronic device, it has to request the mute indications from the Mobile Station, MS, by the AT*EMIR command (see above).

During Execution
Change Audio Mode
The Accessory has the possibility to change the Audio Mode Selection after initialization by the AT*EAMS command (see above).
Music Mute
When an Accessory receives the unsolicited response command *EMIR: [Activate] (see above), the Accessory will mute the electronic device (for example a car stereo), until it receives the unsolicited response command *EMIR: [Inactivate] (see above).
The following functionality rules apply:
During the Incoming voice call mode phase, the Outgoing voice call mode phase and the Ongoing voice call mode phase, the mute functionality shall be activated.
During Data/Fax calls, the mute functionality shall be inactivated.
During the Idle/Stand-by phase, the mute functionality shall be inactivated.
Connect to Audio Lines
The Accessory may not connect itself to AFMS and/or ATMS, until it receives the unsolicited command *EALR (see above) permitting it to do so. This command can disconnect the audio lines and connect the audio lines either as ATMS only, AFMS only or as both ATMS and AFTM connected.
The accessory may not disconnect the AFMS/ATMS, before it receives *EALR: [disconnect] or the device has been disconnected (removed). One exception may be Portable Hands Free, which is always connected to AFMS/ATMS.
Receive Incoming Call
An incoming call can be received by either of the following actions:
 By pressing the button on the Cordless Hands Free headset unit.
 By pressing the button on the Portable Hands Free.
 By pressing the YES button on the MS.
 By using the voice command Answer in the Voice Activated Answer VAA functionality.
 By hook off in the HandSet HS unit.
If the Hands Free unit wants to receive an incoming call, it may indicate this to the Mobile Station by sending the AT*EVA command (see above).
If AT*EVA or ATA is sent from an audio accessory, the call is automatically routed to this accessory, otherwise the call is routed in the same way as if the call is answered from the MS.

End Ongoing Call

An ongoing call can be ended by either of the following actions:

By pressing the NO button on the Mobile Station.

By pressing the button on the Cordless Hands Free headset unit.

By pressing the button on the Portable Hands Free

By hook on the HandSet HS unit

If the Hands Free unit wants to terminate an ongoing call, this is done by sending the AT*EVH command (see above) to the MS.

The AT*EVH and ATH commands will terminate the call, regardless of which accessory that has the call.

User Defined User Busy of an Incoming Call

An incoming call can be rejected by the following actions:

Call Setup

If AT*EVD or ATD is sent from an audio accessory, the call is automatically routed to this accessory. Otherwise the call is routed in the same way as for a Call setup from the keypad of the MS.

Specific Requirements for Terminating Accessory:

Examples of such accessories are Portable Hands Free and Cordless Hands Free. The accessory has to be located at the end of the accessory chain.

Specific Requirements for Cascade Accessories:

An example of such an accessory is a stationary Hands Free unit.

It shall be able to reconstruct the system connector at the downstream side.

It shall detect if the voltage level of CFMS on the downstream side is constantly low. In that case the cascade accessory shall send the AT command: AT*EPHD command (see above).

Other accessories than audio accessories may be involved in the accessory chain connected to the MS. One example is a battery charger. Such a non-audio accessory shall be able to reconstruct the system connector on the downstream side, and shall detect if the voltage level of CFMS on the downstream side is constantly low. In that case the accessory shall send the AT*EPHD command to the MS (see above).

5. AUDIO CONTROL STATE MACHINE

The State Machine Graph

As previously mentioned, the audio control state machine is divided into two parts, which are shown in FIGS. 3 and 4:

The Call State Machine (FIG. 3)

The Routing State Machine (FIG. 4)

A state may only be left in response to the events indicated in the state graph. For example, if the user has an ongoing call in an handsfree (HF) unit, that state cannot be left by making a hook-on for a handset (HS).

Description of the States in the Call State Machine

Idle (Stand-by)

No call in progress in the Mobile Station (MS); the MS is in stand-by mode.

Alert

A state where the Mobile Station, MS, and the accessories inform the user of an incoming call.

Keypad-initiated Call

A state where the initialization of a call originating from the keypad starts. The only part of the call initialization that is not included in this state is the confirmation of the call by means of the YES button on the Mobile Station, MS.

Two examples of keypad-initiated call are dialing a number or selecting a record in the phonebook.

Internal/External VAD Selection

A state selection indicating whether the Voice Activated Dialing, VAD, functionality shall be handled by the Internal or the External VAD.

Rules:

If an external VAD exists, this unit shall be active.

If the MMI (Man-Machine Interface) functionality of the Mobile Station, MS, has disabled the external VAD functionality, the internal VAD shall be active.

If no external VAD is available, the internal VAD shall be active.

Internal VAD

This is the Voice Activated Dialing, VAD, functionality located internally in the Mobile Station, MS.

External VAD

This is the Voice Activated Dialing, VAD, functionality located external to the Mobile Station, MS, i.e. in a physically external accessory, such as a handsfree unit.

Name Spotting

In this state the Voice Activated Dialing, VAD, function tries to match the vocal input and the samples of names in the internal and/or external VAD directory.

Call

In this state a voice call has been established and is going on. Here it will be possible to change the audio equipment used via the Routing State Machine described below and in FIG. 4.

End Call/Idle

When a call has been disconnected, this state will be entered. In reality there is no difference between this state and the Idle state.

Description of the Events in the Call State Machine

Incoming Call

Indicates that a terminating call is received but not answered.

VAD Activation

Indicates that the Voice Activated Dialing, VAD, functionality has been activated. This event starts the name spotting procedure. There are a number of ways to activate the VAD functionality:

By pressing the button on the Mobile station, MS. This activation will also set the routing to the Direct Activated Audio Accessories.

By pressing the PHF button on the Portable Hands Free, PHF. This activation will also set the routing to the Portable HandsFree Unit.

By pressing the CHF button on the Cordless Hands Free, CHF. This activation will also set the routing to the Cordless HandsFree Unit.

YES (Button)

Indicates that the YES button on the Mobile Station, MS, has been pushed. This activation will also set the routing to the Direct Activated Audio Accessories.

NO (Button)

Indicates that the NO button on Mobile Station, MS, has been pushed.

'YES' (Voice)

Indicates the voice command YES. This command is included in the Voice Activated Answering/Voice Activated Dialing VAA/VAD functionality and accepts the incoming call. This activation will also set the routing to the Direct Activated Audio Accessories.

'NO' (Voice)

Indicates the voice command NO. This command is included in the Voice Activated Answering/Voice Activated Dialing VAA/VAD functionality and rejects the incoming call.

Button Activation

Indicates that the button on Cordless Hands Free, CHF, or the Portable Hands Free, PHF, has been pushed. This activation will also set the routing to the either Cordless HandsFree, CHF, or Portable HandsFree, PHF.

Hook Lift

Indicates that the HandSet, HS, unit has been lifted. This activation will also set the routing to the HandSet unit.

Hook Place

Indicates that the HandSet, HS, unit has been returned to the HS holder.

Description of the States in the Routing State machine:

The routing state machine is a sub state machine of the call state machine described above. Here, the decision is taken where to route the call. The following general rules apply:

The device that activated the VAD functionality shall receive the call.

If the call was not initialized by the VAD functionality, the call shall be routed to the device with the lowest address which requests the audio lines.

Direct Activated Audio Accessories

This is a group of accessories, which ask for Direct Activated Audio. When set active, routing shall be made to the active Direct Activated Audio equipment.

Only one accessory can be set as active Direct Activated Audio accessory.

Phone

This is the default Direct Activated Audio equipment. If set active, routing shall be made to the MS (Mobile Station).

HF (Hands Free)

This is a Direct Activated Audio Accessory, which when connected will ask for the active status.

If several Direct Activated Audio accessories are connected, the last connected one (i.e. the accessory with highest logical address) shall be the one receiving the active status.

PHF (Portable Hands Free)

The Portable Hands Free unit is a type of Direct Activated Audio accessory.

HS (Handset)

Audio call in progress, which is routed to the HS (HandSet).

CHF (Cordless Hands Free)

Audio call in progress, which is routed to the CHF (Cordless Hands Free).

Description of the Events in the Routing State Machine:

HF Connected

An event in which the phone is connected to a direct activated HandsFree unit:

The active status of the Direct Activated Audio equipment will be transferred from the Phone to the HandsFree. The default routing will be to the HandsFree unit.

If a call is in progress, the audio shall be transferred from the Phone to the HandsFree as fast as possible.

Since only one accessory in the Audio state machine can be a direct activated accessory at the same time, if more than one audio accessory register as direct activated, the last connected accessory shall be the valid one.

No HF connected

An event in which the phone is disconnected from a direct activated HandsFree unit:

The active status of the Direct Activated Audio equipment will be transferred from the HandsFree to the Phone. The default routing will be to the Phone.

If a call is in progress, the audio shall be transferred from the HandsFree to the Phone as fast as possible.

PHF connected

An event in which a PHF is connected to a Direct Activated Audio unit:

The active status of the Direct Activated Audio equipment will be transferred from the Phone/HandsFree to the PHF. The default routing will be to the Portable Hands-Free unit.

If a call is in progress, the audio shall be transferred from the Direct Activated Audio equipment to the Portable HandsFree as fast as possible.

No PHF connected

An event in which the PHF is disconnected from a Direct Activated Audio unit:

The active status of the Direct Activated Audio equipment will be transferred from the Portable HandsFree unit to the remaining Direct Activated Audio equipment. The default routing will be to the Direct Activated Audio unit.

If a call is in progress, the audio shall be transferred from the Portable HandsFree unit to the active Direct Activated Audio unit as fast as possible.

Button activation

See above

Hook lift

See above

Hook place

See above

HF (button)

Indicates that the HandsFree button on the Mobile Station, MS, has been pushed. Changes the routing to the Direct Activated Audio unit.

Phone (button)

Indicates that the Phone button on the Mobile Station, MS, has been pushed. Changes the routing to the Direct Activated Audio unit.

Rules for call handling:

If you have one active call and one on hold, pressing YES on the MS will swap the calls independently of the state currently occupied.

When an originated call is made and more than one audio accessory is connected, the user will always get the call in the Hands Free, HF, (PHF) equipment, if available, or the Mobile Station, MS, if the HF (PHF) is not available. All other audio accessories have to be activated by some means indicated in the state machine graph.

When a Portable HandsFree, PHF, is connected, it will always get the audio lines.

If more than one Direct Activated Audio accessory is connected to the phone, the last connected accessory shall be the active one.

6. USE CASE I: STATIONARY HANDS FREE UNIT CONNECTED TO MOBILE STATION

If necessary, authentication of the accessory shall be performed prior to this use case.

This use case exemplifies initiation of the connected accessory and occurrence of an incoming call, which is answered and followed by a disconnection of the call.

| Phase | MS action | D | Hands Free action | User action |
|---|---|---|---|---|
| Initialization | | ⇐ | AT*EAMS = Requests HF Advanced audio functionality settings. | Connect Advanced HF to MS |
| | | ⇐ | AT*EARS = Request Ring signal | |
| | | ⇐ | AT*EALR = Request of ATMS/AFMS | |
| | | ⇐ | AT*EVAD = External VAD exists | |
| | *EVAD = Enable external VAD | ⇒ | | |
| | | ⇐ | AT*EMIR = Request Mute functionality | |
| Incoming Call indication | Audio ASIC: On | | | |
| | *EALR = Request AFMS/ATMS | ⇒ | Gets AFMS/ATMS | |
| | *EMIR: 'Mute' | ⇒ | Mute car stereo | |
| | Unsolicited 'Ring' | ⇒ | | |
| | Ring Signal on AFMS | ⇒ | Ring signal in speaker | |
| Accepting and connecting the call | | ⇐ | AT*EVA (if 'YES' from Hands Free) | Takes the call by MS <YES> key or 'YES' from Hands Free |
| | *EALR = Request AFMS/ATMS | ⇒ | Gets AFMS/ATMS | |
| Disconnect call | | | | Press <NO> key on the MS or from Hands Free |
| | *EALR = Disable AFMS/ATMS | ⇒ | Disable AFMS/ATMS | |
| | Audio ASIC: Off | | | |
| | *EMIR: 'Disable Mute' | | Disable mute on the car stereo | |

7. USE CASE II: STATIONARY HANDS FREE UNIT AND A CORDLESS HANDS FREE CONNECTED TO MOBILE STATION

If necessary, authentication of the accessory shall be performed prior to this use case.

This use case exemplifies initiation of the connected accessories and occurrence of an incoming call, which is answered and taken by the CHF, followed by a disconnection of the call by the CHF.

| Phase | Cordless Hands Free (CHF) action | D | MS action | D | Advanced Hands Free (HF) action | User action |
|---|---|---|---|---|---|---|
| Initialization of HF | | | | ⇐ | AT*EAMS = Requests HF Advanced audio functionality settings | Connect Advanced HF to MS |
| | | | | ⇐ | AT*EARS = Request Ring Siqnal | |
| | | | | ⇐ | AT*EALR = Request of ATMS /AFMS | |
| | | | | ⇐ | AT*EVAD = External VAD exists | |

-continued

| Phase | Cordless Hands Free (CHF) action | D | MS action | D | Advanced Hands Free (HF) action | User action |
|---|---|---|---|---|---|---|
| | | | *EVAD = Enable external VAD | => | | |
| | | | | <= | AT*EMIR = Request Mute functionality | |
| Initialization of CHF | AT*EAMS = Requests CHF audio functionality settings. | => | | | | Connect CHF to the HF Advanced |
| | AT*EARS = Request of Ring Signal | => | | | | |
| | AT*EALR = Request ATMS /AFMS | => | | | | |
| Incoming Call indication | | | Audio ASIC: on | | | |
| | Gets AFMS | <= | *EALR = Set AFMS | | | |
| | | | *EALR = Set ATMS/AFMS | => | Gets AFMS/ATMS | |
| | | | *EMIR: 'Mute' | => | Mute car stereo | |
| | | <= | Unsolicited "Ring" | => | | |
| | Ring signal in CHF speaker | <= | Ring Signal on AFMS | => | Ring signal in HF speaker | |
| Accepting and connecting the call in CHF | | | | | | Press the button on the CHF |
| | AT*ECBP(CHF button is pressed) | => | | | | |
| | Disable AFMS/ATMS | <= | *EALR = Disable ATMS/AFMS | => | Disable AFMS/ATMS | |
| | Gets AFMS/ATMS | <= | *EALR = Enable ATMS/AFMS | | | |
| Disconnect call | | | | | | Press the button on the CHF |
| | AT*ECBP(CHF button is pressed) | => | | | | |
| | Disable AFMS/ATMS | <= | *EALR = Disable ATMS/AFMS | | | |
| | | | Audio ASIC: off | | | |
| | | | *EMIR: 'Disable Mute' | => | Disable mute on the car stereo | |

The invention has been described above with reference to a preferred embodiment. However, the present invention shall in no way be limited by the description above; the scope of the invention is best defined by the appended independent claims. Other embodiments than the particular one described above are equally possible within the scope of the invention.

What is claimed is:

1. A portable teleconmnunication apparatus, comprising:
an audio input for receiving sound;
an audio output for generating sound;
a controller for controlling the audio input and the audio output; and
an audio accessory interface for operatively connecting at least two audio accessories, each audio accessory being capable of receiving external sound and forwarding it as an audio signal over an audio interface to the apparatus and being capable of generating external sound in response to audio signals supplied from the apparatus over the audio interface,
wherein the controller is arranged to receive over a control interface a request for an audio service from any of at least two audio accessories operatively connected to the apparatus, the request for audio service from any of the audio accessories including a first command specifying a number of audio parameters for a particular audio mode and at least one secondary command specifying one of a plurality of audio functions to be performed by the portable telecommunication apparatus in accordance with the specified audio parameters, and
wherein the controller includes a logical state machine, the individual states of which represent possible operational conditions for the portable telecommunication apparatus and the at least two audio accessories, the state machine defining how the request for audio service, including the first and second commands, is to be serviced by the portable telecommunications apparatus, the controller being arranged to provide the audio service to any of the audio accessories as defined by the state machine.

2. A portable telecommunications apparatus according to claim 1, wherein the controller is arranged to authenticate each audio accessory by checking a predefined authentication sequence sent by each audio accessory before the audio service request is considered.

3. The portable telecommunications apparatus according to claim 1, wherein the controller is arranged to establish a corresponding logical control channel for each accessory, and wherein the first and second commands from each accessory are received on each accessory's corresponding optical control channel.

4. The portable telecommunications apparatus according to claim 1, wherein the controller is arranged to dynamically assign an address to each accessory depending on an order in which each accessory is coupled to the portable telecommunications apparatus.

5. A portable telecommunications apparatus according to claim 1, wherein the second command specifies one or more of the following audio services to be performed by the portable telecommunications apparatus: ring signal, music mute, voice activated dialing, vocal call termination, and normal speech.

6. The portable telecommunications apparatus according to claim 5, wherein first and second commands are AT commands based upon a command set developed to control modems from a computer terminal.

7. The portable telecommunications apparatus according to claim 1, wherein the controller is arranged to selectively send a third command to at least one of the accessories to permit the one accessory to connect to or disconnect from an audio channel.

8. The portable telecommunications apparatus according to claim 1, wherein the first and second commands may be sent from one of the accessories at an initialization procedure with the portable telecommunications apparatus or after the initialization procedure.

9. A portable telecommunications apparatus according to claim 1, wherein the audio accessory interface comprises an electrical or optical cord.

10. A portable telecommunications apparatus according to claim 1, wherein the audio accessory interface comprises means for cordless communication.

11. A portable telecommunications apparatus according to claim 1, wherein the audio accessory interface comprises means for radio communication.

12. A portable telecommunications apparatus according to claim 1, wherein the audio accessory interface comprises means for infrared (IR) communication.

13. A portable telecommunications apparatus according to claim 1, wherein the apparatus is a wireless radio telephone.

14. A portable telecommunications apparatus according to claim 1, wherein the audio accessories comprise a portable computer.

15. A portable telecommunications apparatus according to claim 1, wherein the audio accessories comprise a stationary handsfree unit.

16. A portable telecommunications apparatus according to claim 1, wherein the audio accessories comprise a portable handsfree unit.

17. A portable telecommunications apparatus according to claim 16, wherein the portable handsfree unit is cordless.

18. A method of audio control for a portable telecommunication apparatus, including an audio input for receiving sound, an audio output for generating sound, a controller for controlling the audio input and the audio output, and an audio accessory interface for operatively connecting one of plural external audio accessories, each audio accessory being capable of receiving and forwarding external sound as an audio signal to the apparatus and/or capable of generating external sound in response to audio signals supplied from the apparatus, comprising:

receiving a request for audio service from one of the audio accessories operatively connected to the apparatus including a first command specifying a number of audio parameters for a particular audio mode and at least one secondary command specifying one of a plurality of audio functions to be provided by the portable telecommunication apparatus in accordance with the specified audio parameters, and in response to the requested audio service, including the first and second commands, defining a state in a logical state machine representing operational conditions for the requested audio service to be provided by the portable telecommunication apparatus; and providing the audio service to the one audio accessory according to the defined state.

19. A method according to claim 18, wherein the controller is arranged to authenticate each audio accessory by checking a predefined authentication sequence sent by each audio accessory before the audio service request is considered.

20. The method according to claim 18, wherein the controller is arranged to establish a corresponding logical control channel for each accessory, and wherein the first and second commands from each accessory is received on each accessory's corresponding logical control channel.

21. The method according to claim 18, wherein the controller is arranged to dynamically assign an address to each accessory depending on an order in which each accessory is coupled to the portable telecommunications apparatus.

22. The method according to claim 18, wherein first and second commands are AT commands based upon a command set developed to control modems from a computer terminal.

23. The method according to claim 18, wherein the controller is arranged to selectively send a third command to at least one of the accessories to permit the one accessory to connect to or disconnect from an audio line.

24. The method according to claim 18, wherein the first and second commands may be sent from one of the accessories at an initialization procedure with the portable telecommunications apparatus after the initialization.

25. A method according to claim 18, wherein the second command is a request for one or more of the following:

a ring signal, an Audio To Mobile Station (AIMS) signal or an Audio From Mobile Station (AFMS) signal, external Voice Activated Dialing (VAD), vocal call termination, normal speech, data or fax transmission for the audio accessory of the at last two accessories sending the request, and mute functionality for muting another electronic device operatively connected to the telecommunications apparatus.

26. A method according to claim 25, wherein the external VAD is enabled by the telecommunication apparatus for the audio accessory that has sent a request for external voice activated dialing (VAD).

27. A method according to claim 25, further comprising:
detecting an incoming call;

enabling ATMS or AFMS for one or more accessories that requested ATMS or AFMS, sending a ring signal on AFMS to the one or more accessories from which the telecommunication apparatus has received a request for a ring signal;

receiving a request from one of the accessories for answering the incoming call; and enabling ATMS or AFMS only for the accessory that has sent the request for answering the incoming call.

28. A method according to claim 27, further comprising:

receiving a request for audio service from an additional accessory which is operatively connected to the apparatus;

disabling the ATMS or AFMS for the accessory on which the call is ongoing; and enabling ATMS or AFMS only for the additional accessory for taking over the ongoing call.

29. A method according to claim 27, further comprising:

receiving a signal from the accessory handling the call or the telecommunication apparatus for terminating the call; and disabling the ATMS or AFMS for the accessory on which the call is ongoing.

* * * * *